United States Patent Office 3,511,675
Patented May 12, 1970

3,511,675
COLORED ALUMINUM-BITUMINOUS
COATING COMPOSITIONS
Earl F. Carlston, El Cerrito, Calif., assignor to Chevron Research Company, San Francisco, Calif., a corporation of Delaware
No Drawing. Filed Apr. 18, 1967, Ser. No. 631,591
Int. Cl. C09d 3/24
U.S. Cl. 106—280
5 Claims

ABSTRACT OF THE DISCLOSURE

A colored aluminum-containing, bituminous-base, weather-resistant coating composition which comprises a bituminous binder, a hydrocarbon solvent therefor, asbestos fibers, ground mica, a color pigment and a polyurea material effective as an additive which prevents settling out of fillers and pigments and enhances the color of the finished coating.

BACKGROUND OF THE INVENTION

Field of the invention

The present invention relates to filled aluminum-bituminous coating compositions or paints and, more particularly, to colored coating compositions of the aforementioned type, whose properties have been significantly improved by the addition of certain polyurea materials which enhance weatherability, reduce the tendency of color pigments and fillers to settle out, and brighten the coloring of the finished coated surface.

Description of the prior art

The use of bitumen, such as asphalt, coal-tar pitch and the like, in water-proofing and damp-proofing roofs and walls of buildings is known. Cutback-type bituminous coatings, whether unfilled or containing comminuted fillers, such as powdered mica and/or finely cut asbestos fibers, have been used in the industry and found to offer effective and lasting protection to the underlying surface.

Since bitumens, in particular asphalt and tar, owing to their dark color, are seldom decorative, addition of aluminum powder or flake and other color pigments has been proposed, and aluminum-bituminous paints have attained considerable popularity because the coatings applied therewith last a long time, resist weathering and display a bright metallic surface. Such coating compositions or paints are disclosed, for instance, by Buchanan in U.S. Pat. No. 2,477,236. Incorporation of color pigments other than aluminum powder or flake, when the shiny metallic surface is not desired, has also been proposed. However, satisfactory pastel-like colors in most instances are not achieved because the usually deep black color of asphalt, tar and other like bitumens tends to obscure the color of the added pigments, in particular, of greens and blues. Another drawback frequently encountered in colored aluminum-containing filled bituminous coatings or paints consists in that, owing to their "cutback" character, color pigments, aluminum flake and various fillers tend to settle out in the container (pot or drum), while aluminum flakes in particular rise to the surface of the paint and also agglomerate in spots on the coated surface after the application of the paint. The lower is the viscosity of the coating or paint, the greater is the tendency of the fillers and pigments to settle out. This is what happens if the colored bituminous paint is "cut back" with additional organic solvent or diluent to reduce the intensity of the black color of the bituminous component. At the same time, introduction of effective amounts of mineral fillers (up to 30% by weight of the entire coating composition) is desirable because, as pointed out, for instance, in U.S. Pat. No. 2,923,639, issued to Wilkinson, fillers provide for a greater shatter strength of the coating, higher fire resistance and lesser susceptibility to slippage. Moreover, the fillers enhance weatherability, increase resistance to abrasion and impart better vapor-barrier properties (see Dickson, Industrial and Engineering Chemistry, April 1966, p. 26). Thus in the case of aluminum flakes, the higher is the content of aluminum in the paint, the better is the resistance of the finished coating to weathering. Among the many fillers, ground mica is known to increase fire resistance and durability of the coatings, while asbestos fibers are employed to prevent slippage of coatings from metal surfaces, particularly when temperatures higher than 140° F. are met within industrail installations or buildings.

It is thus apparent that formulators were faced heretofore with a difficult problem of discovering such a coating composition or paint as would embody the characteristics of an effective bituminous cutback binder, such as an asphalt or the like, filled with mica and asbestos and containing, in addition, aluminum flake and a color pigment, without being subject to an undesirable settling out of such fillers and pigments, and without displaying excessively a metallic sheen of aluminum on the surface of a laid coating and/or a dark, dulled appearance of a finished coating due to the dark color of the bituminous base binder.

SUMMARY OF THE INVENTION

It has been found that an aluminum-bituminous composition colored with a pigment, which provides good weatherability and strength to a coating laid therewith and imparts a pleasant to contemplate, pastel-like coloration unaffected by the basic black color of the bitumen, and furthermore is free from excessive luster or sheen of the aluminum, can be obtained, and that this newly found composition is not subject to the drawback of random settling out of color pigments and fillers.

The aforementioned desirable characteristics of the colored aluminum-bituminous compositions of the present invention are due to the presence therein of added polyurea materials produced by reacting diisocyanates with monoamines or mixtures of monoamines and diamines. These polyureas have at least 2 urea groups in their molecular structure and are terminated by hydrocarbon end members (hydrocarbyl radicals). They are prepared in a known manner, reacting a diisocyanate with an amine or a mixture of amines at temperatures which may vary from about 70° to about 200° F., resorting to external heating or cooling, as it may be necessary. These polyureas can be represented by a general formula:

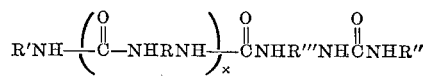

in which R' and R'' may be the same or different hydrocarbyl radicals of 1 to 30 carbon atoms, R and R''' may be the same or different hydrocarbylene radicals of 2 to 30 carbon atoms, and $x$ may be a number from 0 to 8. Broadly speaking, any polyurea material having at least 2 urea units—HNC(O)NH—and hydrocarbon terminal end members thereon, when it is soluble in a known, conventionally used hydrocarbon solvent, would be operative in the formulations of the present invention.

Because of the considerations of solubility in commonly used commercial hydrocarbon solvents, the relative cost and availability of different hydrocarbon solvents for polyureas as their molecular weight increases, and the cost of manufacturing higher polyureas (or rather mixtures thereof), polyurea products (or mixtures) having from at least 2 to as high 6 urea units, are preferred as additives effective in preventing settlement of pigments and fillers and enhancing the color of the coating formulations of the present invention. In other words, the subscript $x$ in the general formula given hereinabove is preferably a number from 0 to 4.

As examples of operative polyurea additives, there may be mentioned: the diurea material produced by reacting 1 mole of tolylene diisocyanate with 2 moles of tall oil fatty monoamine, another diurea material produced by reacting the same diisocyanate (1 mole) with 2 moles of a mixture of tall oil fatty monoamine with p-dodecyl aniline (mole ratio of the fatty monoamine to the aniline being 1:1), and the like diureas and higher polyureas.

The preparation of these polyureas, the proportions of the reactants for this preparation and the corresponding reaction conditions have been described in the art, for instance in U.S. Pat. No. 3,015,625, issued to Rosscup and Liehe, and U.S. Pat. No. 3,243,372, issued to Dreher and Goodrich. The terminal groups of the polyureas described in the last named patent are hydrocarbylene of from 1 to 30 carbon atoms, and the interior groups are from 2 to 30 carbon atoms.

The essential components of the improved colored aluminum-bituminous composition of the invention are:

(1) A bituminous binder (asphalt, tar or the like), characterized by softening points in the range from about 130° to about 200° F. (ASTM D-36) and by a flash point (ASTM D-92, COC) of at least 425° F., in amounts which may range from about 5 to about 15% by weight;

(2) A volatile hydrocarbon solvent or thinner for the bitumen in amounts which may be varied from about 30 to about 40% by weight, boiling from about 300° to about 450° F. (ASTM D-86) and bringing the consistency of the final composition to a workable level when being applied as a surface coating or roofing or wall paint;

(3) From about 8 to about 10% by weight of aluminum flake, used as a paste of known commercial type;

(4) From about 10 to about 20% by weight of ground mica as a filler for enhancing fire resistance and durability of the finished coatings;

(5) From about 5 to about 15% by weight of finely cut asbestos fibers, the presence of which improves weatherability and prevents sliding off (slippage) of the coating from metal surfaces when the temperature rises above about 140° F.;

(6) From about 1 to about 15% by weight of a color pigment, the exact amounts within the above range depending on the desired intensity of a particular color;

(7) From about 0.5 to about 5% by weight of the polyurea additive prepared as described hereinabove, which reduces the leafing tendency of flake aluminum, prevents the settling out of fillers and pigments, eliminates bleeding of the bituminous binder, and contributes to the establishment of an improved strong coating of a pleasant pastel-like color, without being accompanied by the drawbacks formerly experienced with similar aluminum-bituminous type coatings.

DESCRIPTION OF PREFERRED EMBODIMENTS

In formulating the compositions of the present invention, it is preferred to form first a suitable bituminous cutback. Thus, for instance, when using asphalt as a bituminous binder, steam- and air-refined asphalts available in commerce under the trademark designation of "Petrolastics" and included in the softening point range from about 130° to about 200° F., are heated to from about 150 to about 250° F. and then "cut back" (thinned) with a light hydrocarbon distillate, such as a crude solvent naphtha or the commonly available in the trade, predominantly naphthenic, petroleum thinner boiling between 310° and 450° F. The bituminous cutback thus formed may be further diluted by adding to it a lubricating oil extract from conventional refinery solvent treatment of petroleum base stocks, for instance, in a weight ratio of one part of the bituminous binder to one part of such lubricating oil extract. This ratio may be higher or lower, whichever may be preferred under the circumstances. As an example, a lubricating oil extract from a California naphthenic crude, known in the industry under the designation of "Zerolene 9 Extract" ("Zerolene" being a trademark for the corresponding lubricating oil), lends itself readily for the purpose. At this point, in order to improve (intensify) the color, one may further add to the dilution of the bituminous cutback an alkyd resin as an additional diluent, for instance, a soybean long-oil alkyd, in an amount of from about 20 to about 40% by weight of the bituminous binder component in the final formulation. Then the polyurea additive will be incorporated into the mix. Next the fillers (mica and asbestos) are added and thoroughly distributed in the resulting dilution, followed by the addition of aluminum flake (as a paste) and of the color pigment. The final composition is now cooled down to room temperature and, if so desired, thinned out further with a volatile hydrocarbon thinner to attain the final desired workable consistency.

The coatings are applied in any suitable manner either by brush or by spraying or other known paint application techniques.

As an illustration of the invention, the following compositions in Table I have been formulated as hereinbefore described and applied on lacquered cardboard panels about 8" x 11" in size by brushing on so as to form a uniform coating. The solvent was allowed to evaporate, and after a period of 24 hours of being exposed to the air, the panels were observed and the observations compared with the observations of similarly formulated compositions, which, however, either the polyurea additive or the lubricating oil extract diluent or both of these components were absent.

TABLE I.—COATING COMPOSITIONS TESTED

| | Percent by weight | | | | |
| --- | --- | --- | --- | --- | --- |
| | Green | Blue | Rose-Beige | Yellow | Tan |
| Component | I | II | III | IV | V |
| Binder: Petrolastic Asphalt No. 185 | 6.0 | 6.0 | 10.0 | 10.0 | 10.0 |
| Diluents: | | | | | |
| Zerolene 9 extract | 6.0 | 6.0 | 10.0 | 10.0 | 10.0 |
| Soybean oil long-oil alkyd (70% nonvolatiles) | 7.8 | 7.8 | | | |
| Petroleum thinner (boiling between 310–450° F) | 27.7 | 27.9 | 23.8 | 26.0 | 24.9 |
| Polyurea reaction product (a diurea): | | | | | |
| 30% tall oil fatty amine in the same petroleum thinner | 2.5 | 2.5 | 2.5 | 2.5 | 2.5 |
| 10% tolylene diisocyanate in the same petroleum thinner | 2.5 | 2.5 | 2.5 | 2.5 | 2.5 |
| Fillers: | | | | | |
| Asbestos fiber | 9.5 | 9.5 | 9.5 | 9.5 | 9.5 |
| Mica powder | 19.0 | 19.6 | 14.2 | 14.2 | 14.2 |
| Aluminum paste | 14.5 | 14.5 | 14.5 | 14.5 | 14.5 |
| Color pigments: | | | | | |
| Green paste | 4.5 | | | | |
| Blue paste | | 3.7 | | | |
| Red iron oxide | | | 12.0 | | 6.5 |
| Black iron oxide | | | 1.0 | | |
| Yellow iron oxide | | | | 10.8 | 5.4 |

When the panels were examined, 24 hours following the application of different coatings, it was noted that the color was improved. Instead of the dark dull appearance of those coatings which had been laid with compositions prepared without adding the polyurea additive and without diluting them with a lubricating oil extract as described hereinbefore, it was observed that, whenever the lubricating oil extract was used to dilute the cutback bituminous binder further, the color of the coatings was intensified and was less masked by the dark color of the binder, although some metallic aluminum sheen was apparent. When both the lubricating oil extract diluent and the polyurea additive were present in the composition, and the composition was applied by brushing it in a film on the panels, their examination revealed that the color was surprisingly intensified and that the black background of the binder (asphalt) was not at all noticeable. Neither was the metallic sheen of aluminum observed to prevail over the color of the pigment. The painted surface appeared to be covered by a uniform coating of pastel-like paint and displayed lasting flexibility without evidence of deterioration.

In another series of tests, the coating composition used was formulated by mixing the several components together as described hereinbefore. The basic formulation, before the addition of polyureas, had the following composition:

Binder:  Grams
    Petrolastic Asphalt No. 185 _____ 950
Diluents:
    Zerolene 9 extract _____ 950
    Petroleum hydrocarbon thinner (boiling between 310–450° F.) _____ 2200
Fillers:
    Asbestos fibers _____ 900
    Mica powder _____ 1340
Color pigments:
    Red iron oxide _____ 1040
    Black iron oxide _____ 190

Six samples of this formulation, each weighing 380 g., were combined with aluminum paste (69 g.), additional (46 g.) petroleum hydrocarbon thinner boiling between 310–450° F., and 5 g. that is, about 1% by weight, of different polyureas.

The following six polyurea additives were prepared by reacting:

(1) 76.8% of tall oil fatty monoamine with 23.2% of tolylene diisocyanate;

(2) 76.8% of paradodecyl aniline and 23.2% of tolylene diisocyanate;

(3) 76.8% of a mixture of tall oil fatty monoamine and paradodecyl aniline in a 1:1 mole ratio with 23.2% of tolylene diisocyanate;

(4) A mixture of 57.5% of tall oil fatty monoamine and 8.0% of 1,3-propane diamine with 34.5% of tolylene diisocyanate;

(5) A mixture of 72.0% of tall oil fatty monoamine and 2.0% of 1,3-propanediamine with 26% of tolylene diisocyanate;

(6) A mixture of 49.6% by weight of tall oil fatty monoamine and 13.7% of 1,3-propane diamine with 36.7% of tolylene diisocyanate.

The first three additives were diureas, the next two were tetraureas, and the last one was a hexaurea.

After compounding the six formulation samples with the corresponding polyureas, the resulting compositions were further diluted to a workable consistency in the range from 35 to 50 seconds (measured on Gardner Mobilometer with a total working weight of 200 g.).

Lacquered cardboard panels were then coated by brushing on the several compositions containing the polyurea additives and also one composition which contained no polyurea. The results of observations made within three days of the application are shown in Table II.

TABLE II.—COMPARISON OF PROPERTIES

| Polyurea additive | Solvent added for consistency | Pigment settling in 3 days | Bleeding | Color quality |
|---|---|---|---|---|
| 1 | 25 | Slight | No | Good. |
| 2 | 42 | None | No | Do. |
| 3 | 72 | do | No | Do. |
| 4 | 70 | do | No | Do. |
| 5 | 33 | Slight | No | Do. |
| 6 | 130 | None | No | Do. |
| None | | Considerable | Yes | Metallic. |

In all instances where the compositions contained a polyurea, the coatings laid on the panels were surprisingly good and resilient and had a pleasant, pastel-like color. They displayed no metallic character on the surface and no bleeding of the bituminous binder.

By contrast, the coating produced with a formulation which contained no polyurea exhibited considerable settling of the pigments and also bleeding of the bituminous (asphalt) binder, and its surface had a definite metallic (aluminum) sheen.

While the aforegiven examples of the improved coating compositions of the invention have been carried out by employing representative polyureas produced by reacting tolylene diisocyanate with various combinations of tall oil fatty monoamine, 1,3-propane diamine and p-dodecyl aniline, the disclosure is by no means limited to these specific monoamine and diamine reactants for producing polyureas operative in accordance with the invention.

Other monamines and diamines when reacted with different diisocyanates, such as tolylene diisocyanate, phenylene diisocyanate and the like, in the proportions and under the reaction conditions disclosed in the previously mentioned U.S. Pat. No. 3,243,372, issued to Dreher and Goodrich, may be used successfully to produce polyureas operative in the coating compositions formulated in accordance with the present invention.

I claim:

1. A coating composition consisting essentially of from about 5 to about 15 parts by weight of a bituminous binder having a softening point (ASTM D–36) in the range from about 130 to about 200° F. and a flash point (ASTM D–92, COC) of at least 425° F.; from about 30 to about 40 parts by weight of a liquid hydrocarbon solvent for said binder which boils in the range from about 300 to about 450° F. (ASTM D–86); from about 5 to about 15 parts by weight of finely cut asbestos fibers; from about 10 to about 20 parts of powdered mica; from about 8 to about 10 parts by weight of flake aluminum; from about 1 to about 15 parts by weight of a color pigment; and from about 0.5 to about 5 parts by weight of a polyurea having the general formula:

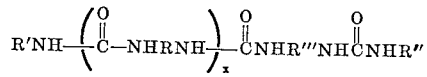

in which R' and R'' are the same or different hydrocarbyl radicals of 1 to 30 carbon atoms, R and R''' are the same or different hydrocarbylene radicals of 2 to 30 carbon atoms, and $x$ is a number from 0 to 8.

2. A coating composition as defined in claim 1 wherein said bituminous binder is asphalt.

3. A coating composition as defined in claim 1, wherein radicals R and R''' in the general formula of the polyurea are tolylenes.

4. A coating composition as defined in claim 1, wherein said polyurea is a diurea product of reaction of tall oil fatty monoamine and tolylene diisocyanate.

5. A coating composition as defined in claim 1, wherein said polyurea is a diurea product of reaction of tolylene diisocyanate and a mixture of tall oil fatty monoamine and p-dodecyl aniline in a mole ratio of 1:1.

(References on following page)

References Cited

UNITED STATES PATENTS

| | | | |
|---|---|---|---|
| 2,477,236 | 7/1949 | Buchanan | 106—282 |
| 2,923,639 | 2/1960 | Wilkinson | 106—282 |
| 3,078,240 | 2/1963 | Hoshino et al. | 260—28 XR |
| 3,092,594 | 6/1963 | Heiss | 260—28 XR |
| 3,179,610 | 4/1965 | Wood | 260—28 |
| 3,182,032 | 5/1965 | Charlton et al. | 260—28 |
| 3,210,302 | 10/1965 | Powell et al. | |
| 3,300,429 | 1/1967 | Glavis et al. | 260—28 XR |
| 3,360,389 | 12/1967 | Frank | 260—28 XR |
| 3,380,950 | 4/1968 | Blomeyer. | |

JULIUS FROME, Primary Examiner

J. B. EVANS, Assistant Examiner

U.S. Cl. X.R.

106—281